(12) United States Patent
Ma

(10) Patent No.: US 12,100,942 B1
(45) Date of Patent: Sep. 24, 2024

(54) BATTERY MODULE AND ENERGY STORAGE DEVICE

(71) Applicants: SHENZHEN HITHIUM ENERGY STORAGE TECHNOLOGY CO., LTD., Shenzhen (CN); XIAMEN HITHIUM ENERGY STORAGE TECHNOLOGY CO., LTD., Fujian (CN)

(72) Inventor: Yaqiang Ma, Fujian (CN)

(73) Assignees: SHENZHEN HITHIUM ENERGY STORAGE TECHNOLOGY CO., LTD., Shenzhen (CN); XIAMEN HITHIUM ENERGY STORAGE TECHNOLOGY CO., LTD., Fujian (CN)

( * ) Notice: Subject to any disclaimer, the term of this patent is extended or adjusted under 35 U.S.C. 154(b) by 0 days.

(21) Appl. No.: 18/644,930

(22) Filed: Apr. 24, 2024

(30) Foreign Application Priority Data

Jun. 16, 2023 (CN) .......................... 202310718976.1

(51) Int. Cl.
*H02G 5/10* (2006.01)
*H01M 50/209* (2021.01)
*H01M 50/502* (2021.01)

(52) U.S. Cl.
CPC ............ *H02G 5/10* (2013.01); *H01M 50/209* (2021.01); *H01M 50/502* (2021.01)

(58) Field of Classification Search
CPC ..... H02G 5/10; H01M 50/502; H01M 50/209
USPC ......................................................... 429/99
See application file for complete search history.

(56) References Cited

U.S. PATENT DOCUMENTS

| 9,219,261 | B2 * | 12/2015 | Kim | .................. | H01M 10/6553 |
| 11,784,369 | B1 * | 10/2023 | Wright | ............... | H01M 50/209 |
| | | | | | 429/50 |
| 2023/0291028 | A1 * | 9/2023 | Yokell | ................ | H01M 10/633 |

FOREIGN PATENT DOCUMENTS

| CN | 206422183 U | 8/2017 |
| CN | 212676355 U | 3/2021 |
| CN | 212934752 U | 4/2021 |
| CN | 213124634 U | 5/2021 |
| CN | 216698632 U | 6/2022 |
| CN | 216793932 U | 6/2022 |
| CN | 217589140 U | 10/2022 |
| CN | 2017589140 U | 10/2022 |
| CN | 115579552 A | 1/2023 |
| CN | 115842189 A | 3/2023 |

(Continued)

OTHER PUBLICATIONS

Chinese Notice of Allowance dated Aug. 23, 2023 received in Chinese Application No. 202310718976.1.

(Continued)

*Primary Examiner* — James M Erwin
(74) *Attorney, Agent, or Firm* — Scully, Scott, Murphy & Presser, P.C.

(57) ABSTRACT

A battery module and an energy storage device are provided. The battery module includes at least two battery cells, each of the at least two battery cells having a respective top cover; at least one bus-bar, each of the at least one bus-bar being arranged above two respective adjacent top covers, and electrically connected to poles provided on the two adjacent top covers; and a liquid cooling tube provided on all the top covers and cooperates with the at least one bus-bar for heat transfer.

18 Claims, 8 Drawing Sheets

(56) References Cited

FOREIGN PATENT DOCUMENTS

| | | |
|---|---|---|
| CN | 115954622 A | 4/2023 |
| CN | 219067138 U | 5/2023 |
| CN | 2019067138 U | 5/2023 |
| CN | 116454468 A | 7/2023 |
| JP | 2012-227164 A | 11/2012 |
| WO | 2012/023754 A1 | 2/2012 |
| WO | 2022/011513 A1 | 1/2022 |
| WO | 2022/156083 A1 | 7/2022 |

OTHER PUBLICATIONS

Chinese Office Action dated Jul. 25, 2023 received in Chinese Application No. 202310718976.1, together with an English-language translation.
International Search Report dated Apr. 24, 2024 received in International Application No. PCT/CN2024/076260.

\* cited by examiner

BATTERY MODULE AND ENERGY STORAGE DEVICE

CROSS-REFERENCE TO RELATED APPLICATION

This application is based upon and claims priority to Chinese Patent Application No. 202310718976.1, filed on Jun. 16, 2023, the entire contents of which are incorporated herein by reference for all purposes.

TECHNICAL FIELD

The present disclosure relates to the technical field of battery thermal management, and in particular to a battery module and an energy storage device.

BACKGROUND

Currently, in order to meet requirements of high current and long battery life, secondary batteries are more likely to exist in the form of battery modules. The battery module is usually composed of several battery cells that are connected in series, and adjacent battery cells are electrically connected through a bus-bar so that the current of several battery cells can be gathered into one output. The bus-bar carries a certain amount of current, and thus there will be a heating problem.

SUMMARY

In an aspect, the present disclosure provides a battery module, including:
- at least two battery cells, each battery cell of the at least two battery cells having a respective top cover;
- at least one bus-bar, each bus-bar of the at least one bus-bar being disposed above two respective adjacent top covers and electrically connected to poles disposed on the two adjacent top covers; and
- a liquid cooling tube, disposed above all the top covers and cooperate with the at least one bus-bar for heat transfer.

In another aspect, the present disclosure also provides an energy storage device, which includes the battery module as described above.

BRIEF DESCRIPTION OF THE DRAWINGS

The drawings forming a part of the present disclosure are used to provide a further understanding of the present disclosure. The illustrative embodiments of the present disclosure and the description thereof are used to explain the present disclosure and do not constitute an improper limitation on the present disclosure.

In order to more clearly illustrate the technical solutions in the embodiments of the present disclosure, the drawings to be used in the description of the embodiments will be briefly introduced below. Obviously, the drawings in the following description are only some embodiments of the present disclosure, and other drawings can also be obtained by those of ordinary skill in the art based on these drawings without exerting creative efforts.

Figure 1:
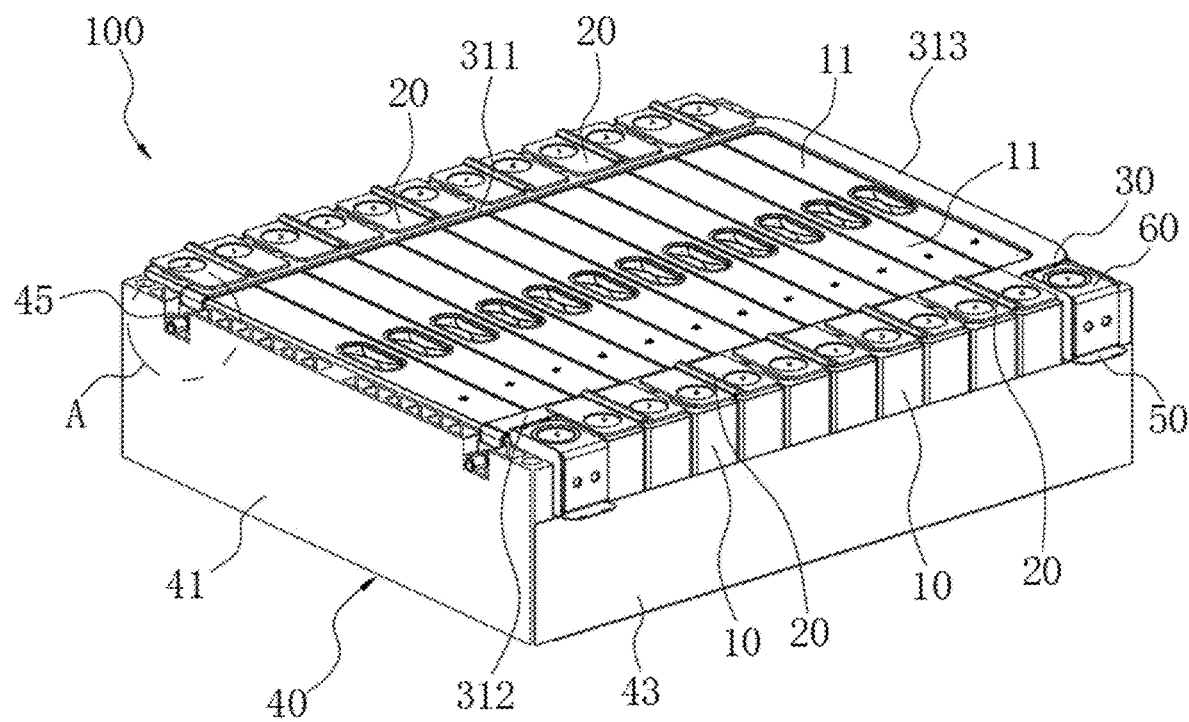
FIG. 1 is a schematic structural diagram of a battery module according to an embodiment of the present disclosure.

Explanation of reference numerals shown in the figures: 100. Battery module; 10. Battery cell; 11. Top cover; 12. Pole; 20. Bus-bar; 30. Liquid cooling tube; 31. Liquid cooling tube body; 311. First liquid cooling tube section; 311$a$. First bent section; 311$b$. First end; 311$c$. Second end; 312. Second liquid cooling tube section; 312$a$. Second bent section; 312$b$. First end; 312$c$. Second end; 313. Connecting tube section; 313$a$. First end; 313$b$. Second end; 32. Thermally conductive insulating layer; 33. Liquid inlet connector; 34. Liquid inlet collecting pipe; 35. Liquid outlet connector; 36. Liquid outlet collecting pipe; 40. Box; 41. First end plate; 411. First side; 412. Second side; 42. Second end plate; 43. First side plate; 44. Second side plate; 45. Limiting installation part; 451. First limiting part; 452. Second limiting part; 453. Flared part; 50. Lead-out pole base; 60. Lead-out pole.

DETAILED DESCRIPTION

In order to make the above objects, features and advantages of the present disclosure more obvious and easier to understand, the specific implementations of the present disclosure will be described in detail below with reference to the accompanying drawings. In the following description, numerous specific details are set forth in order to provide a thorough understanding of the present disclosure. However, the present disclosure can be implemented in many other ways different from those described here. Those skilled in the art can make similar improvements without violating the connotation of the present disclosure. Therefore, the present disclosure is not limited by the specific embodiments disclosed below.

It should be understood that in the description of the present disclosure, if the terms such as "center", "longitudinal", "transverse", "length", "width", "thickness", "upper", "lower", "front", "back", "left", "right", "vertical", "horizontal", "top", "bottom", "inside", "outside", "clockwise", "counterclockwise", "axial", "radial", "circumferential" are used, the orientation or positional relationship indicated by these terms is based on the orientation or positional relationship shown in the drawings, and is only for the convenience of describing the present disclosure and simplifying the description, rather than indicating or implying that the device or element referred to must have the specific orientation or be constructed and operate in the specific orientation, and therefore cannot be construed as limitation on the present disclosure.

In addition, if the terms such as "first" and "second" are used, these terms are used for descriptive purposes only and cannot be understood as indicating or implying the relative importance or implicitly indicating the quantity of the indicated technical features. Therefore, the features defined with "first" and "second" may explicitly or implicitly include at least one of these features. In the description of the present disclosure, if the term "a plurality of" is used, the meaning of "a plurality of" is at least two, such as two, three, etc., unless otherwise expressly and specifically indicated.

In the present disclosure, unless otherwise expressly indicated and limited, if the terms such as "installing", "connected", "connecting", "fixing" are used, these terms should be interpreted in broad sense. For example, there can be a fixed connection or a detachable connection, or there can be integrated; there can be a mechanical connection or an electrical connection; there can be a direct connection or an indirect connection through an intermediate medium; or there can be internal communication between two components or interaction between two elements, unless otherwise expressly limited. Those of ordinary skill in the art can understand the specific meanings of the above terms in the present disclosure according to specific circumstances.

In the present disclosure, if a first feature is "on" or "below" a second feature or there is similar descriptions, the meaning thereof may be that the first and second features are in direct contact, or the first and second features are in indirect contact through an intermediate medium, unless otherwise explicitly stated and limited. Furthermore, the first feature being "on", "above" and "over" the second feature may mean that the first feature is directly above or diagonally above the second feature, or simply means that the first feature is higher in level than the second feature. The first feature being "below", "under" and "beneath" the second feature may mean that the first feature is directly below or diagonally below the second feature, or simply means that the first feature is lower in level than the second feature.

It should be noted that if an element is referred to as being "fixed to" or "disposed on" another element, it can be directly on the other element or there may be an intervening element. If an element is said to be "connected" to another element, it can be directly connected to the other element or there may also be an intervening element. The terms such as "vertical", "horizontal", "upper", "lower", "left", "right" and similar expressions, if used in the present disclosure, are for illustrative purposes only and are not meant to indicate exclusive implementation.

At present, the bus-bar generally adopts natural cooling for heat dissipation. However, with the continuous improvement of battery fast charging rate and the continuous increase of battery capacity, the charging current will inevitably increase, which directly leads to a multiple growth trend in the heat generation of the bus-bar. Therefore, the existing natural cooling method can no longer meet the heat dissipation needs of the bus-bar. In view of this, in related art, it attempts to increase width and thickness sizes of the bus-bar or replace materials with higher overcurrent coefficients to improve the overcurrent capacity of the bus-bar and reduce the heat generation. However, increasing the width and thickness of the bus-bar will result in more installation space occupied by the bus-bar, and when the current increases to a certain value, since the width and thickness of the bus-bar cannot continue to be increased, there is still a problem of not being able to meet the overcurrent capability. And using materials with higher overcurrent capacity to manufacture bus-bars will lead to a significant increase in processing costs and difficulties.

In view of the above, it is necessary to provide a battery module and energy storage device so as to solve the problems of the heat dissipation capability of the bus-bar being limited by the sizes, and the high processing costs and difficulties.

Referring to FIGS. 1, 3, 4 and 6, a battery module 100 according to an embodiment of the present disclosure is shown. The battery module 100 includes at least two battery cells 10, at least one bus-bar 20 and a liquid cooling tube 30. For example, FIG. 1 shows a battery module 100 loaded with twelve battery cells 10. The battery cells 10 are rectangular batteries, and the twelve battery cells 10 are arranged side by side in the same direction in such a way that their large surfaces (sides) match with each other (for example, are in contact with each other or maintain a preset gap therebetween).

In other embodiments, the battery cell 10 may also be a cylindrical cell or the like.

In addition, FIG. 1 shows that the number of the bus-bars 20 is also twelve. Six of the bus-bars 20 are arranged in a line at one end of the battery module 100 in the length direction, and each bus-bar 20 is electrically connected to positive poles 12 of two adjacent battery cells 10. The remaining six bus-bars 20 are arranged in a line at the other end of the battery module 100 in the length direction, and each bus-bar 20 is electrically connected to negative poles 12 of two adjacent battery cells 10.

Optionally, the electrical connection between the bus-bars 20 and the positive poles 12 and the negative poles 12 may be welding or otherwise.

Figure 7:
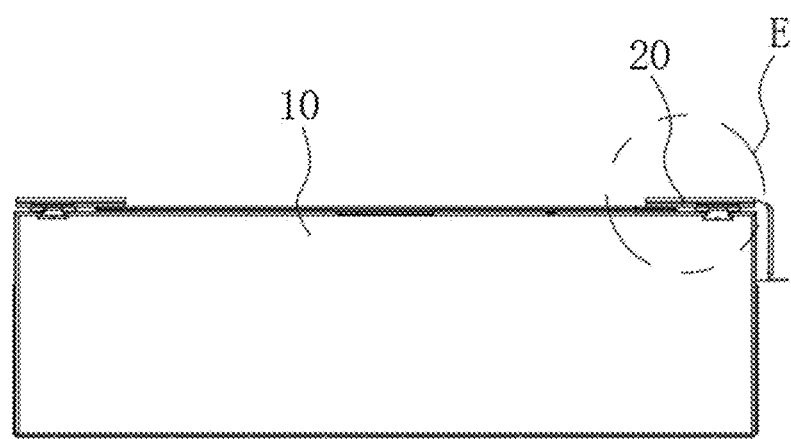
FIG. 7 is a cross-sectional structural diagram at D-D in FIG. 6.
Figure 8:
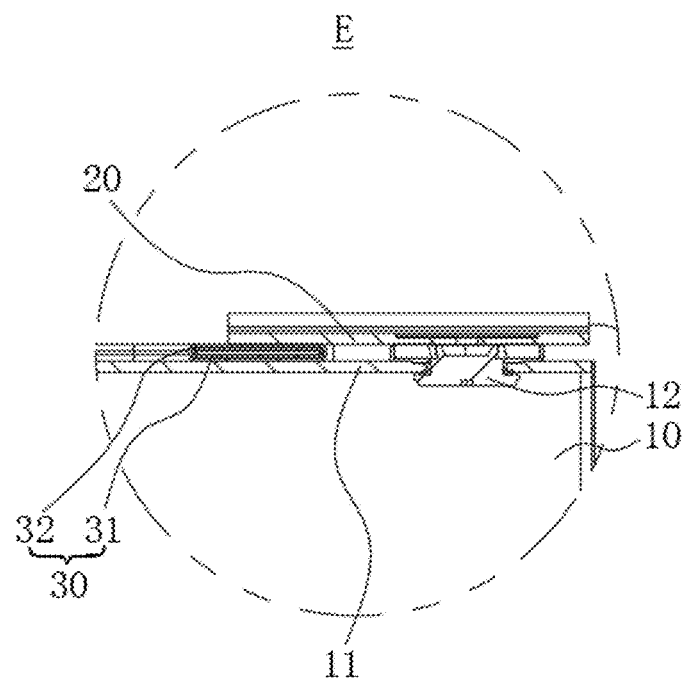
FIG. 8 is a partial enlarged structural view at E in FIG. 7.
Figure 9:
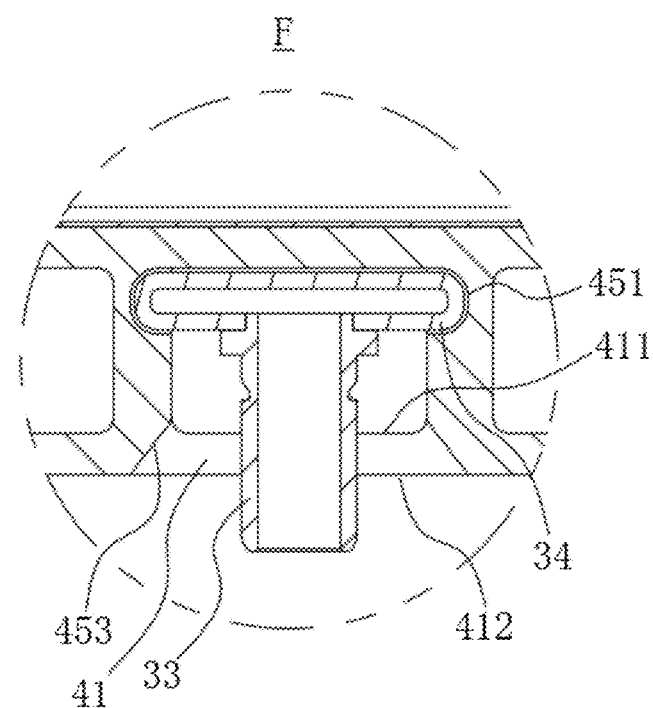
FIG. 9 is a partial enlarged structural view at F in FIG. 6.
Figure 10:
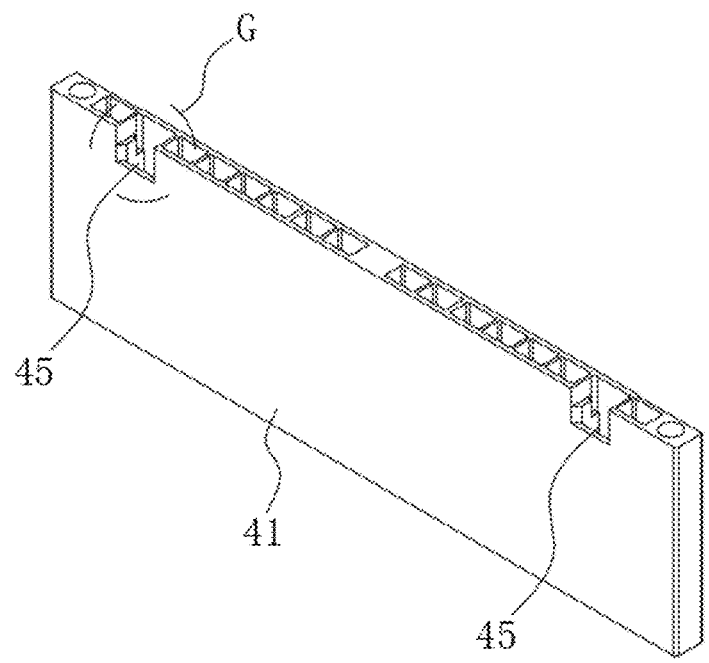
FIG. 10 is a schematic structural diagram of a first end plate.
Figure 11:
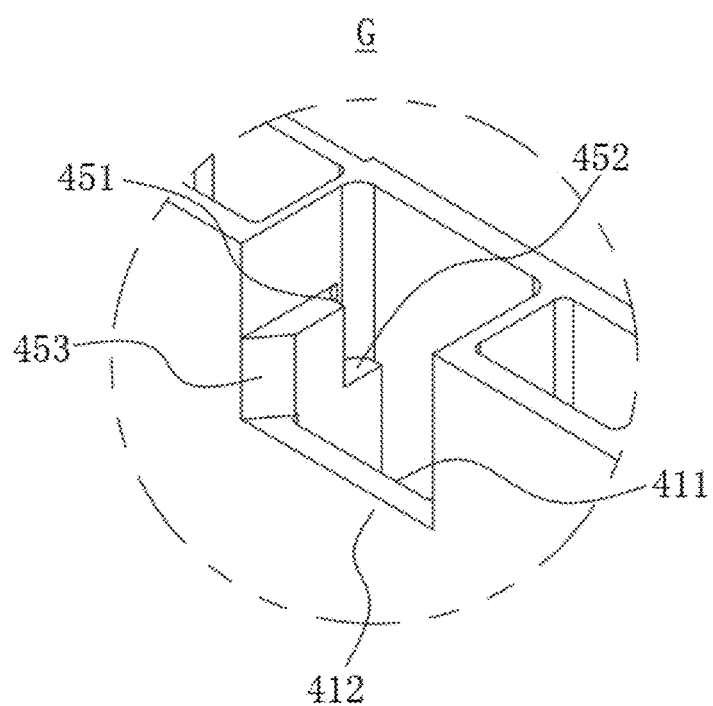
FIG. 11 is a partial enlarged structural view at G in FIG. 10.
Figure 12:
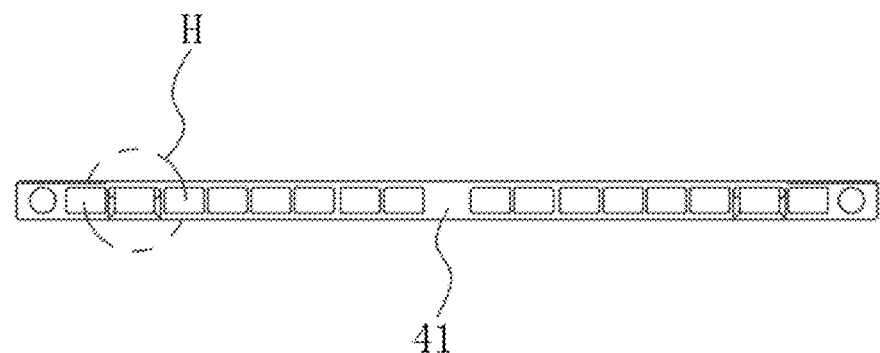
FIG. 12 is a top structural view of the first end plate in FIG. 10.
Figure 13:
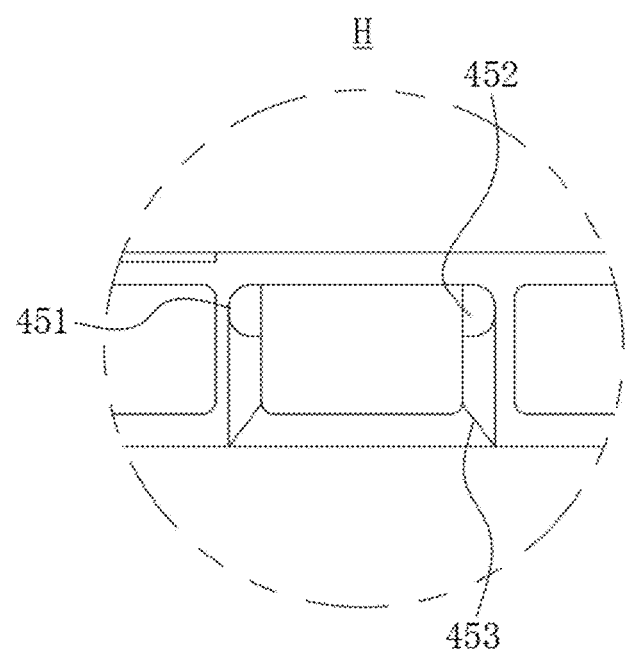
FIG. 13 is a partial enlarged structural view at H in FIG. 12.

Continuing to refer to FIGS. 7 and 8, each of the battery cells 10 has a respective top cover 11; each of the bus-bars 20 is disposed above two adjacent top covers 11, and each of the bus-bars 20 is electrically connected to the poles 12 provided on the two adjacent top covers 11. The liquid cooling tube 30 is arranged on all the top covers 11 and cooperate with all the bus-bars 20 for heat transfer.

In summation, implementing the technical solution of this embodiment will provide the following beneficial effects. In the battery module 100 of the above solution, by installing the liquid cooling tube 30 between the top covers 11 of the battery cells 10 and the bus-bars 20, when the high-rate and large-capacity battery module 100 operates with large-current charging and discharging, which increases the current flowing through the bus-bar 20 and causes the heat generated by the bus-bar 20 to significantly increase, the liquid cooling tube 30 is communicated with an external cooling medium supply device which will input cooling medium to the liquid cooling tube 30, and the cooling medium can realize heat exchange with the bus-bars 20 through the wall of the liquid cooling tube 30. In this way, the high-temperature heat of the bus-bars 20 can be quickly absorbed and taken away by the cooling medium, realizing the cooling effect of the bus-bars 20 by the liquid cooling tube 30, well solving the problem of excessive heat generated by the bus-bars 20 in higher overcurrent scenarios, and improving the overcurrent capacity of the bus-bars 20. This solution does not require increasing the width and thickness of the bus-bar, does not take up too much installation space, does not limit the overcurrent capacity of the bus-bar 20 by the size, and does not need to use materials with better overcurrent capacity for the bus-bar 20. Thus, the problems of high processing costs and difficulties can be solved.

In operation, in the large overcurrent scenarios with high-rate and large-capacity battery, the liquid cooling tube 30 can actually achieve heat dissipation and cooling of the heat generating positions such as the bus-bars 20, the welding parts of the poles 12 and the bus-bars 20, the welding parts of the poles 12 and tabs inside the battery, and the welding parts of the tabs inside the battery and bare battery cells.

Figure 2:
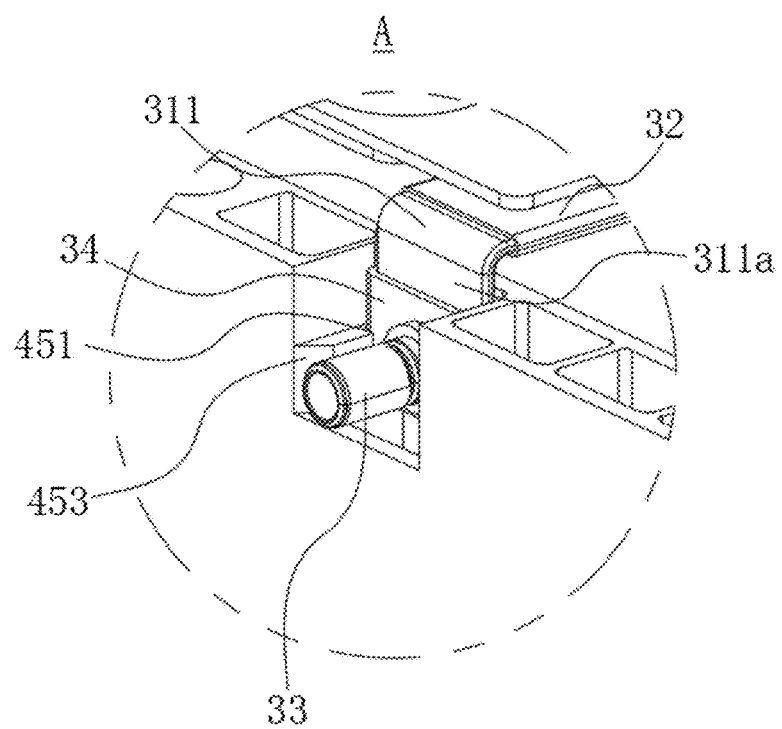
FIG. 2 is a partial enlarged structural view at A in FIG. 1.
Figure 5:
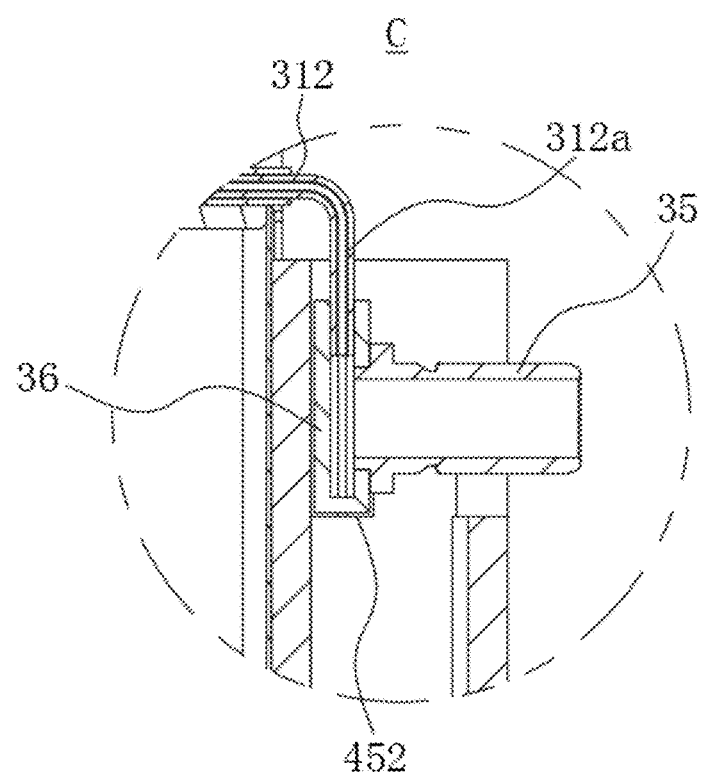
FIG. 5 is a partial enlarged structural view at C in FIG. 4.

Continuing to refer to FIGS. 1, 2, and 5, in some embodiments, the liquid cooling tube 30 includes a liquid cooling tube body 31 and a thermally conductive insulating layer 32. The thermally conductive insulating layer 32 is installed on the outside of the liquid cooling tube body 31, and the thermally conductive insulation layer 32 abuts against the bus-bars 20. A flow passage is formed inside the liquid cooling tube body 31, and the cooling medium can flow in the flow passage, so that heat can be transferred with the bus-bars 20 through the tube wall of the liquid cooling tube body 31, so as to achieve cooling and heat dissipation of the bus-bars 20.

According to actual needs, the cooling medium may be, but is not limited to, any one of water, oil, or the like, or a mixture of two or more.

The thermally conductive insulation layer 32 installed on the outside of the liquid cooling tube body 31 is made of compressible materials with high thermal conductivity and good insulation effect. For example, thermally conductive silica gel is used in the embodiment, and in addition to assist rapid heat conduction to the liquid cooling tube body 31 from the bus-bars 20, it can ensure insulation protection to be formed between the bus-bars 20 and the liquid cooling tube body 31.

During manufacturing, under the action of tooling pressure, the bus-bars 20 forms surface contact with the positive and negative poles 12, and then the electrical connection is implemented through laser welding. Meanwhile, the thermally conductive insulating layer 32 will be subjected to the pressure from the bus-bars 20, so as to form thermal conductive contact between the liquid cooling tube 30 and the bus-bars 20. Such a connection method is fast and simple, which improves production efficiency.

In the present disclosure, the heat dissipation of the bus-bars 20 is assisted by the liquid cooling tube 30, and the core lies in the design of the heat exchange contact area between the liquid cooling tube 30 and the bus-bars 20. In some embodiments, the width of the liquid cooling tube body 31 ranges from 15 mm to 48 mm. If the width of the liquid cooling tube body 31 is small, the heat exchange contact area with the bus-bars 20 will be small, which will affect the cooling and heat dissipation performance of the liquid cooling tube 30 for the bus-bars 20; and if the width of the liquid cooling tube body 31 is overly large, part of the width of the liquid cooling tube body 31 cannot contact the bus-bar 20, that is, it cannot participate in the heat transfer at all, resulting in excess width and heavy weight of the liquid cooling tube body 31 and increased costs due to increased consumables. By controlling the width of the liquid cooling tube body 31 within the range of 15 mm to 48 mm, the above problems can be avoided and the use requirements of the bus-bars 20 of different sizes can be met.

Furthermore, the liquid cooling tube body 31 uses a flat tube. The flat tube has a first wide surface and a second wide surface that are opposite to each other. The first wide surface is in contact with the top covers 11, and the second wide surface is in contact with the bus-bars 20. After installation, the overall height of the battery module 100 can be reduced, the installation space occupied can be reduced, and the miniaturization design of the battery module 100 can be facilitated.

Optionally, a cross section of the flat tube may be any one of rectangular shape, elliptical shape, etc.

Figure 14:
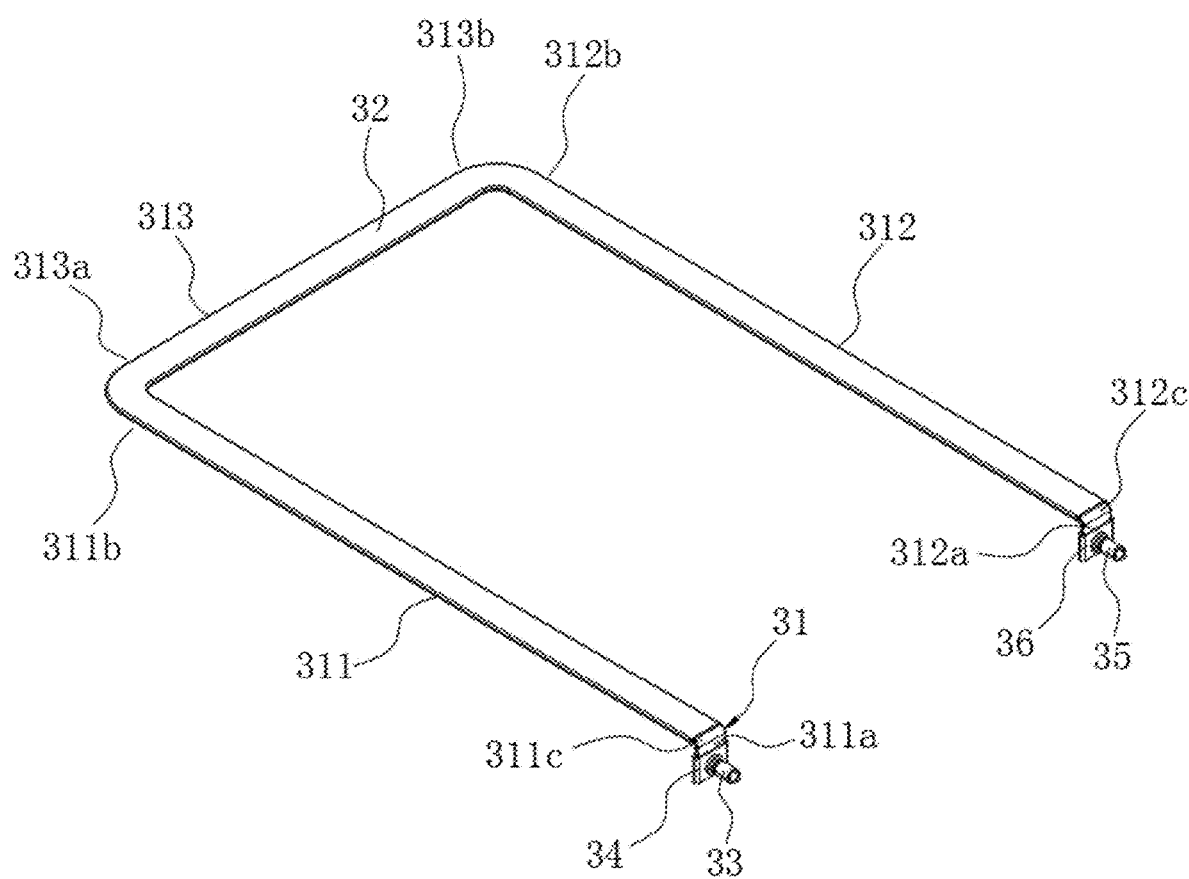
FIG. 14 is a schematic structural diagram of a liquid cooling tube according to an embodiment of the present disclosure.

Continuing to refer to FIGS. 1 and 14, additionally, in some embodiments, the liquid cooling tube body 31 includes a first liquid cooling tube section 311, a second liquid cooling tube section 312 and a connecting tube section 313. A first end 313a of the connecting tube section 313 is communicated with a first end 311b of the first liquid cooling tube section 311, and a second end 313b of the connecting tube section 313 is communicated with a first end 312b of the second liquid cooling tube section 312. For example, in this embodiment, the first liquid cooling tube section 311, the connecting tube section 313 and the second liquid cooling tube section 312 match to form a U-shaped or C-shaped structure.

The first liquid cooling tube section 311 is arranged close to the poles 12 at one end of the battery cells 10, the second liquid cooling tube section 312 is arranged close to the poles 12 at the other end of the battery cells 10, and the connecting tube section 313 is arranged close to the edge of the battery module 100.

Employing the U-shaped or C-shaped structural design for the liquid cooling tube body 31 can not only prevent the first liquid cooling tube section 311, the second liquid cooling tube section 312 and the connecting tube section 313 from blocking parts such as explosion-proof valves in the middle of the battery cells 10, but also shorten the length of the liquid cooling tube body 31 so as to reduce consumables and manufacturing costs. In addition, the first liquid cooling tube section 311 and the second liquid cooling tube section 312 are arranged closer to the poles 12 at both ends of the battery cells 10 in the length direction, making it easier to form reliable heat transfer contact with the bus-bars 20 and conducive to reducing the size of the bus-bars 20.

It can be understood that when multiple battery cells 10 are arranged side by side, a row of multiple poles corresponding to the first liquid cooling tube section 311 and a row of multiple poles corresponding to the second liquid cooling tube section 312 are arranged in a positive and negative alternating manner to achieve series connection of the battery cells 10.

Continuing to refer to FIGS. 1 to 5, on the basis of the above embodiments, the liquid cooling tube 30 also includes a liquid inlet connector 33, a liquid inlet collecting pipe 34, a liquid outlet connector 35 and a liquid outlet collecting pipe 36. A second end 311c of the first liquid cooling tube section 311 is communicated with the liquid inlet collecting pipe 34, the liquid inlet connector 33 is communicated with the liquid inlet collecting pipe 34, and a second end 312c of the second liquid cooling tube section 312 is communicated with the liquid outlet collecting pipe 36, and the liquid outlet collecting pipe 36 is communicated with the liquid outlet connector 35. The cooling medium is conveniently input from the liquid inlet connector 33, and then flows into the liquid cooling tube body 31 through the liquid inlet collecting pipe 34. After the cooling medium completes heat transfer with the bus-bars 20, it further flows to the liquid outlet connector 35 through the liquid outlet collecting pipe 36, and is finally discharged from the liquid outlet connector 35 and returned to the cooling medium supply device, realizing recycling of the cooling medium.

Figure 3:
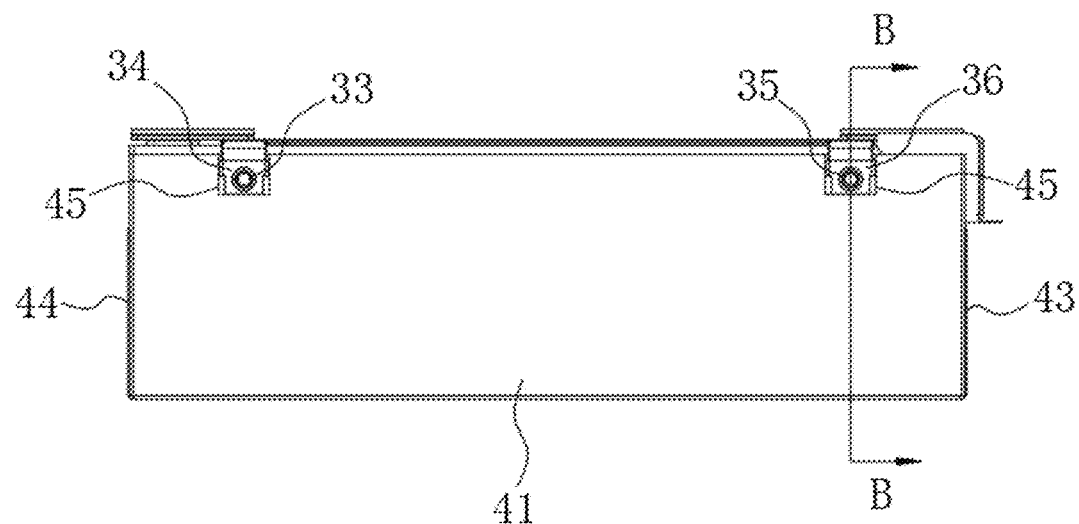
FIG. 3 is a side structural view of the battery module in FIG. 1.
Figure 4:
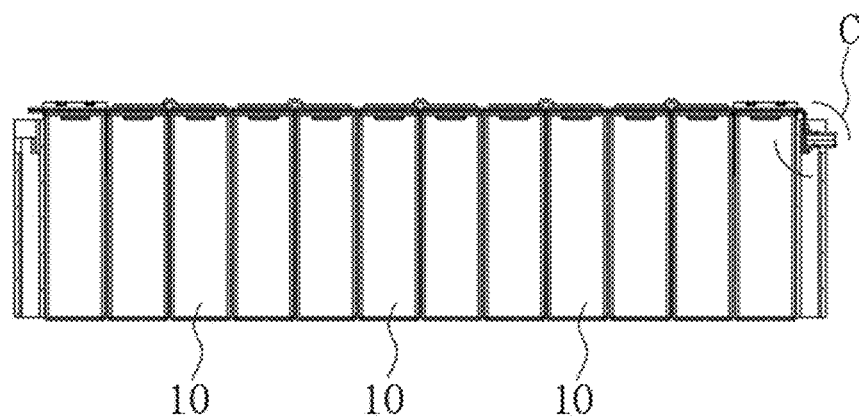
FIG. 4 is a cross-sectional structural view at B-B in FIG. 3.
Figure 6:
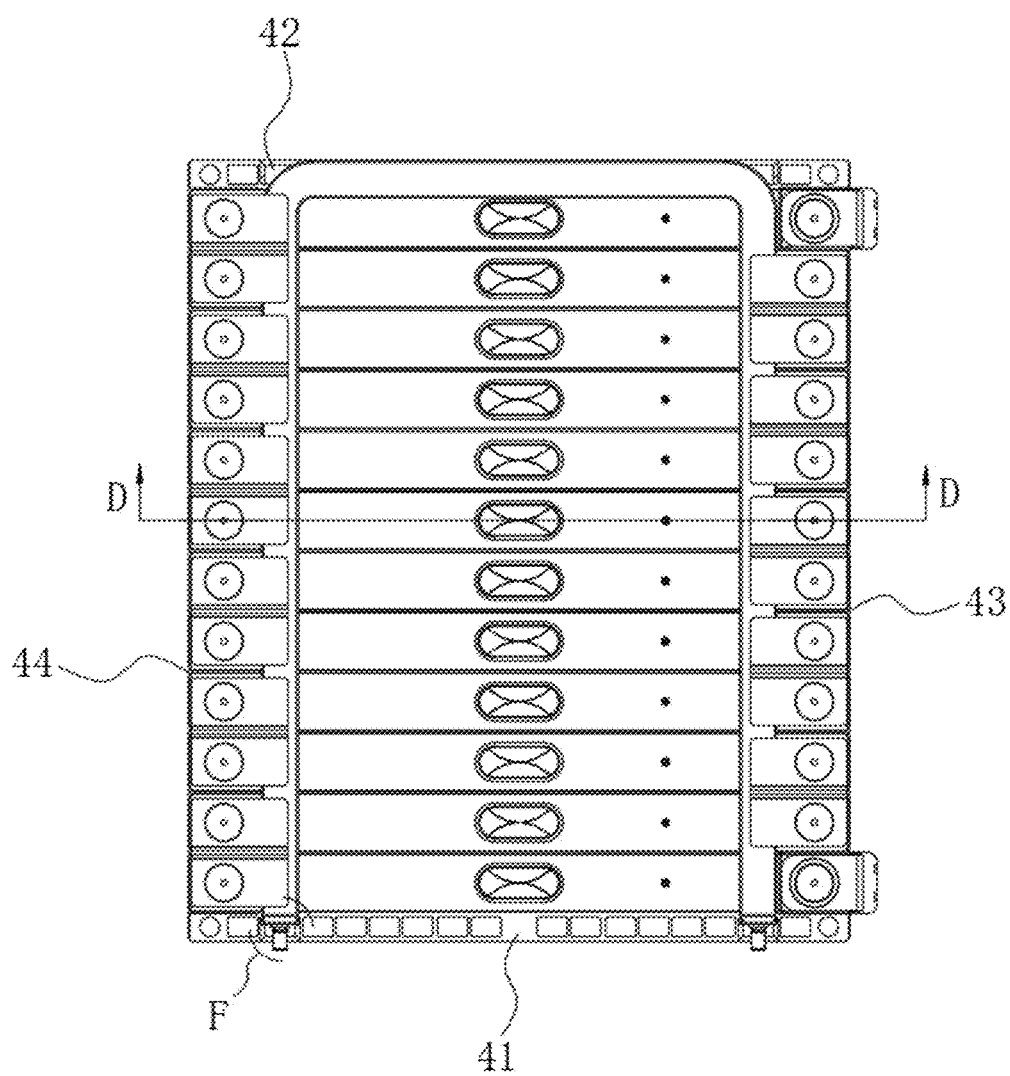
FIG. 6 is a top structural view of the battery module in FIG. 1.

Continuing to refer to FIGS. 1, 3 and 6, additionally, in some embodiments, the battery module 100 further includes a box 40. The box 40 includes a first end plate 41, a second end plate 42, a first side plate 43 and a second side plate 44. The first end plate 41, the first side plate 43, the second end plate 42 and the second side plate 44 are connected end-to-end and define an installation cavity, and all the battery cells 10 are installed in the installation cavity. Further, the box 40 may also include a bottom plate, which loads and supports the first end plate 41, the second end plate 42, the first side plate 43 and the second side plate 44, so that the first end plate 41, the second end plate 42, the first side plate 43 and the second side plate 44 can be erected on the bottom plate and connected end-to-end. When all the battery cells 10 are inserted into the installation cavity, they will be subjected to the pre-tightening effect of the first end plate 41, the second end plate 42, the first side plate 43 and the second side plate 44, forming a stable installation and ensuring that the battery cell 10 is not prone to loosening or falling off.

After installation, the positive and negative poles of the battery cells 10, the top covers 11 and the bus-bars 20 are all located on the upper open side of the box 40 to facilitate connection operations.

Optionally, the first end plate 41, the second end plate 42, the first side plate 43 and the second side plate 44 can be assembled and fixed through any one of methods such as welding, screw connection, snap connection, etc., which can be flexibly selected according to actual needs.

Continuing to refer to FIGS. 2, 3, 5, and 9 to 13, additionally, the first end plate 41 or the second end plate 42 is recessed to form two limiting installation parts 45, and the second end 311c of the first liquid cooling tube section 311 is formed with a first bent section 311a that is bent toward a corresponding one of the two limiting installation parts 45. The liquid inlet collecting pipe 34 is installed at an extension part of the first bent section 311a that is oriented toward the corresponding limiting installation part 45 and is in limiting fit with the limiting installation part 45; the second end 312c of the second liquid cooling tube section 312 is formed with a second bent section 312a that is bent toward another corresponding one of the limiting installation parts 45, and the liquid outlet collecting pipe 36 is installed at an extension part of the second bent section 312a that is oriented toward the other corresponding limiting installation part 45 and is in limiting fit with the other limiting installation part 45. Therefore, after installation, the limiting installation parts 45 can effectively restrict the degree of freedom of the liquid inlet collecting pipe 34 and the liquid outlet collecting pipe 36, thereby achieving the effect of preventing the loosening or even falling of the liquid cooling tube 30, and improving the installation reliability of the liquid cooling tube 30.

For example, in some embodiments, each of the two limiting installation parts 45 includes a first limiting part 451, and the first limiting part 451 is adapted to fit contours of part of the outer tube walls of the liquid inlet collecting pipe 34 and the liquid outlet collecting pipe 36.

For example, taking the installation structure of the first end plate 41, the liquid inlet collecting pipe 34 and the liquid inlet connector 33 as an example, the upper end surface of the first end plate 41 is recessed inward to form a groove, and at least one side wall of the groove is provided with the first limiting parts 451. After the liquid inlet collecting pipe 34 and the liquid inlet connector 33 are inserted into the groove from top to bottom, the left and right side walls of the liquid inlet collecting pipe 34 are precisely engaged with the two first limiting parts 451 in one-to-one correspondence, so that the horizontal movement freedom of the liquid inlet collecting pipe 34 and the liquid inlet connector 33 is constrained, and when the counterpart (i.e., a plug of the cooling liquid supply device) is horizontally inserted and connected with the liquid inlet joint 33, it can ensure that the liquid cooling tube 30 is fixed, thereby avoiding damage to the liquid inlet connector 33 and preventing deformation of the liquid cooling tube 30.

For example, in this embodiment, the first limiting part 451 is designed as a semicircular groove, the liquid inlet collecting pipe 34 uses a flat tube with an elliptical cross-section, and the arc-shaped facet of the liquid inlet collecting pipe 34 can be precisely fit and engaged with the semicircular groove, thereby well restricting the freedom of movement of the liquid inlet collecting pipe 34 in back and forth and left and right.

Furthermore, the limit installation part 45 further includes a second limiting part 452, and the second limiting part 452 abuts against the tube end walls of the liquid inlet collecting pipe 34 and the liquid outlet collecting pipe 36. For example, the second limiting part 452 is a step structure formed on at least one side wall of the groove, and after the liquid inlet collecting pipe 34 is installed in the groove, its lower tube end wall can be in precise lap-joint with the step structure. In this case, the step structure can apply a limit in the −Z axis direction to the liquid inlet collecting pipe 34. At the same time, the bus-bars 20, after being installed and fixed, will press against the upper surface of the liquid cooling tube 30, synchronously applying a limit in the +Z axis direction to the liquid cooling tube 30, completely limiting the degree of freedom in the Z axis direction of the liquid cooling tube 30, ensuring the stable installation of the liquid cooling tube 30 and preventing deformation of the liquid cooling tube 30 due to battery expansion or stress during subsequent maintenance.

Furthermore, each of the two limiting installation parts 45 also includes a flared part 453. The first end plate 41 or the second end plate 42 has a first side 411 and a second side 412 opposite in the thickness direction. The width of the flared part 453 transitions incrementally in the direction from the first side 411 to the second side 412; the liquid inlet connector 33 extends from a corresponding one of two flared parts 453 of the two limiting installation parts 45 and the liquid outlet connector 35 extends from another corresponding one of the two flared parts 453. During installation, if the size of the counterpart (i.e., the plug of the cooling liquid supply device) is of compact size, the flared part 453 can appropriately increase the space for movement and operation when the counterpart is plugged in, facilitating the installation operation.

In some other embodiments, the battery module 100 further includes at least two lead-out electrode bases 50 and at least two lead-out electrodes 60. The lead-out electrode bases 50 are installed on the box 40, and the lead-out electrodes 60 are installed on the lead-out electrode bases 50 in one-to-one correspondence, and the lead-out electrodes 60 are electrically connected to all the bus-bars 20. The bus-bars 20 of a single battery module 100 are electrically connected to the lead-out electrodes 60 to achieve current convergence. On this basis, the lead-out electrodes 60 can also realize electrical connection between different battery modules 100.

In summary, the present disclosure also provides an energy storage device, which includes the battery module 100 as described in any of the above embodiments.

The various technical features of the embodiments described above can be combined in any way. To simplify the description, not all possible combinations of the technical features in the above-described embodiments are described. However, all the combinations of these technical features should be considered to be within the scope of the present specification as long as there is no contradiction in the combinations.

The embodiments described above only represent several implementations of the present disclosure, and their descriptions are relatively specific and detailed, but they should not be construed as limiting the scope of the present disclosure. It should be noted that several modifications and improvements can be made by those of ordinary skill in the art without departing from the concept of the present disclosure, and these all fall within the protection scope of the present disclosure. Therefore, the protection scope of the present disclosure should be defined by the appended claims.

What is claimed is:

1. A battery module comprising:
   at least two battery cells, each of the at least two battery cells having a respective top cover;
   at least one bus-bar, each bus-bar of the at least one bus-bar being disposed above two respective adjacent top covers and electrically connected to poles disposed on the two adjacent top covers; and
   a liquid cooling tube, arranged above all the top covers and cooperating with the at least one bus-bar for heat transfer, wherein the liquid cooling tube is installed between the top covers of the at least two battery cells and the at least one bus-bars,
   wherein the liquid cooling tube comprises a liquid cooling tube body and a thermally conductive insulating layer, the thermally conductive insulating layer is installed on an outside of the liquid cooling tube body, and the thermally conductive insulating layer abuts against the at least one bus-bar,
   wherein the liquid cooling tube body comprises a first liquid cooling tube section and a second liquid cooling tube section, the liquid cooling tube further comprises a liquid inlet connector, a liquid inlet collecting pipe, a liquid outlet connector and a liquid outlet collecting pipe, a second end of the first liquid cooling tube section is communicated with the liquid inlet collecting pipe, the liquid inlet connector is communicated with the liquid inlet collecting pipe, and a second end of the second liquid cooling tube section is communicated with the liquid outlet collecting pipe, and the liquid outlet collecting pipe is communicated with the liquid outlet connector,
   wherein the battery module further comprises a box, the box comprises a first end plate and a second end plate, the first end plate or the second end plate is recessed to form two limiting installation parts, each of the two limiting installation parts comprises a first limiting part, the first limiting part is adapted to fit contours of local outer tube walls of the liquid inlet collecting pipe and the liquid outlet collecting pipe, and each of the two limiting installation parts further comprises a second limiting part, the second limiting part abuts against tube end walls of the liquid inlet collecting pipe and the liquid outlet collecting pipe, and
   wherein each of the two limiting installation parts is a groove, the second limiting part is a step structure formed on at least one side wall of the groove, and after the liquid inlet collecting pipe is installed in the groove, a lower tube end wall of the liquid inlet collecting pipe is in precise lap-joint with the step structure, the step structure applies a limit in a −Z axis direction to the liquid inlet collecting pipe, and the bus-bars after being installed and fixed presses against a upper surface of the liquid cooling tube and synchronously apples a limit in a +Z axis direction to the liquid cooling tube.

2. The battery module according to claim 1, wherein a width of the liquid cooling tube body ranges from 15 mm to 48 mm.

3. The battery module according to claim 1, wherein the liquid cooling tube body is a flat tube, the flat tube has a first wide surface and a second wide surface opposite to each other, the first wide surface abuts against the top cover of each of the at least two battery cells, and the second wide surface abuts against the at least one bus-bar.

4. The battery module according to claim 1, wherein the liquid cooling tube body further comprises a connecting tube section, a first end of the connecting tube section is communicated with a first end of the first liquid cooling tube section, a second end of the connecting tube section is communicated with a first end of the second liquid cooling tube section, the first liquid cooling tube section is arranged close to poles at one end of the battery cells, the second liquid cooling tube section is arranged close to poles at the other end of the battery cells, and the connecting tube section is arranged close to an edge of the battery module.

5. The battery module according to claim 1, wherein the box comprises a first side plate and a second side plate, the first end plate, the first side plate, the second end plate and the second side plate are connected end-to-end and define an installation cavity, and all the battery cells are installed inside the installation cavity.

6. The battery module according to claim 5, wherein the second end of the first liquid cooling tube section is formed with a first bent section that is bent toward a corresponding one of the two limiting installation parts, and the liquid inlet collecting pipe is installed at an extension part of the first bent section that is oriented towards the corresponding one of the limiting installation parts, and the liquid inlet collecting pipe is in limiting fit with the limiting installation part.

7. The battery module according to claim 6, wherein the second end of the second liquid cooling tube section is formed with a second bent section that is bent toward another corresponding one of the two limiting installation parts, and the liquid outlet collecting pipe is installed at an extension part of the second bent section that is oriented toward the other corresponding limiting installation part, and the liquid outlet collecting tub is in limiting fit with the other corresponding limiting installation part.

8. The battery module according to claim 1, wherein each of the two limiting installation parts further comprises a flared part, and the first end plate or the second end plate has a first side and a second side opposite in a thickness direction, and a width of the flared part transitions incrementally in a direction from the first side to the second side.

9. The battery module according to claim 8, wherein the liquid inlet connector extends from a corresponding one of two flared parts of the two limiting installation parts and the liquid outlet connector extends from another corresponding one of the two flared parts.

10. An energy storage device comprising a battery module, wherein the battery module comprises:
    at least two battery cells, each of the at least two battery cells having a respective top cover;
    at least one bus-bar, each bus-bar of the at least one bus-bar being disposed above two respective adjacent top covers and electrically connected to poles disposed on the two adjacent top covers; and
    a liquid cooling tube, arranged above all the top covers and cooperating with the at least one bus-bar for heat transfer, wherein the liquid cooling tube is installed between the top covers of the at least two battery cells and the at least one bus-bars,
    wherein the liquid cooling tube comprises a liquid cooling tube body and a thermally conductive insulating layer, the thermally conductive insulating layer is installed on an outside of the liquid cooling tube body, and the thermally conductive insulating layer abuts against the at least one bus-bar, wherein the liquid cooling tube body comprises a first liquid cooling tube section and a second liquid cooling tube section, the liquid cooling tube further comprises a liquid inlet connector, a liquid inlet collecting pipe, a liquid outlet connector and a liquid outlet collecting pipe, a second end of the first liquid cooling tube section is communicated with the liquid inlet collecting pipe, the liquid inlet connector is communicated with the liquid inlet collecting pipe, and a second end of the second liquid cooling tube section is communicated with the liquid outlet collecting pipe, and the liquid outlet collecting pipe is communicated with the liquid outlet connector, wherein the battery module further comprises a box, the box comprises a first end plate and a second end plate, the first end plate or the second end plate is recessed to form two limiting installation parts, each of the two limiting installation parts comprises a first limiting part, the first limiting part is adapted to fit contours of local outer tube walls of the liquid inlet collecting pipe and the liquid outlet collecting pipe, and each of the two limiting installation parts further comprises a second limiting part, the second limiting part abuts against tube end walls of the liquid inlet collecting pipe and the liquid outlet collecting pipe, and wherein each of the two limiting installation parts is a groove, the second limiting part is a step structure formed on at least one side wall of the groove, and after the liquid inlet collecting pipe is installed in the groove, a lower tube end wall of the liquid inlet collecting pipe is in precise lap-joint with the step structure, the step structure applies a limit in a −Z axis direction to the liquid inlet collecting pipe, and the bus-bars after being installed and fixed presses against a upper surface of the liquid cooling tube and synchronously apples a limit in a +Z axis direction to the liquid cooling tube.

11. The energy storage device according to claim 10, wherein a width of the liquid cooling tube body ranges from 15 mm to 48 mm.

12. The energy storage device according to claim 10, wherein the liquid cooling tube body is a flat tube, the flat tube has a first wide surface and a second wide surface opposite to each other, the first wide surface abuts against the top cover of each of the at least two battery cells, and the second wide surface abuts against the at least one bus-bar.

13. The energy storage device according to claim 10, wherein the liquid cooling tube body further comprises a connecting tube section, a first end of the connecting tube section is communicated with a first end of the first liquid cooling tube section, a second end of the connecting tube section is communicated with a first end of the second liquid cooling tube section, the first liquid cooling tube section is arranged close to poles at one end of the battery cells, the second liquid cooling tube section is arranged close to poles at the other end of the battery cells, and the connecting tube section is arranged close to an edge of the battery module.

14. The energy storage device according to claim 10, wherein the box comprises a first side plate and a second side plate, the first end plate, the first side plate, the second end plate and the second side plate are connected end-to-end and define an installation cavity, and all the battery cells are installed inside the installation cavity.

15. The energy storage device according to claim 14, wherein the second end of the first liquid cooling tube section is formed with a first bent section that is bent toward a corresponding one of the two limiting installation parts, and the liquid inlet collecting pipe is installed at an extension part of the first bent section that is oriented towards the corresponding one of the limiting installation parts, and the liquid inlet collecting pipe is in limiting fit with the limiting installation part.

16. The energy storage device according to claim 15, wherein the second end of the second liquid cooling tube section is formed with a second bent section that is bent toward another corresponding one of the two limiting installation parts, and the liquid outlet collecting pipe is installed at an extension part of the second bent section that is oriented toward the other corresponding limiting installation part and the liquid outlet collecting tub is in limiting fit with the other corresponding limiting installation part.

17. The energy storage device according to claim 10, wherein each of the two limiting installation parts further comprises a flared part, and the first end plate or the second end plate has a first side and a second side opposite in a thickness direction, and a width of the flared part transitions incrementally in a direction from the first side to the second side.

18. The energy storage device according to claim 17, wherein the liquid inlet connector extends from a corresponding one of two flared parts of the two limiting installation parts and the liquid outlet connector extends from another corresponding one of the two flared parts.

\* \* \* \* \*